United States Patent
Li et al.

(10) Patent No.: US 12,231,914 B2
(45) Date of Patent: Feb. 18, 2025

(54) METHODS AND APPARATUSES FOR TIME-DOMAIN BEAM-SWEEPING

(71) Applicant: Telefonaktiebolaget LM Ericsson (publ), Stockholm (SE)

(72) Inventors: Shaohua Li, Kanata (CA); Jianguo Long, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 433 days.

(21) Appl. No.: 17/629,151

(22) PCT Filed: Jul. 31, 2019

(86) PCT No.: PCT/IB2019/056547
§ 371 (c)(1),
(2) Date: Jan. 21, 2022

(87) PCT Pub. No.: WO2021/019287
PCT Pub. Date: Feb. 4, 2021

(65) Prior Publication Data
US 2022/0295297 A1    Sep. 15, 2022

(51) Int. Cl.
*H04W 16/28* (2009.01)
*H04L 5/00* (2006.01)
(Continued)

(52) U.S. Cl.
CPC .......... *H04W 16/28* (2013.01); *H04L 5/0051* (2013.01); *H04W 72/0446* (2013.01); *H04W 72/1263* (2013.01); *H04W 72/542* (2023.01)

(58) Field of Classification Search
CPC ............. H04W 16/28; H04W 72/0446; H04W 72/1263; H04W 72/542; H04L 5/0051;
(Continued)

(56) References Cited

U.S. PATENT DOCUMENTS

| | | |
|---|---|---|
| 2015/0222340 A1 | 8/2015 | Nagata et al. |
| 2018/0227031 A1* | 8/2018 | Guo ..................... H04W 24/10 |
| 2020/0106488 A1* | 4/2020 | Akoum ............... H04W 52/365 |
| 2020/0245166 A1* | 7/2020 | Kwak .................... H04B 7/024 |

FOREIGN PATENT DOCUMENTS

WO    WO-2017193331 A1 * 11/2017

OTHER PUBLICATIONS

International Search Report and Written Opinion dated Feb. 19, 2020 issued in PCT Application No. PCT/IB2019/056547, consisting of 13 pages.
(Continued)

*Primary Examiner* — Steven Hieu D Nguyen
(74) *Attorney, Agent, or Firm* — Weisberg I.P. Law, P.A.

(57) ABSTRACT

Methods and apparatuses for time-domain beam-sweeping are disclosed. In one embodiment, a method implemented in a wireless device (WD) includes receiving a CSI report configuration, the CSI-RS resource configuration and the CSI report configuration mapping each of a plurality of time-domain beam sweeping CSI-RS transmissions in the configured one CSI-RS resource to a corresponding CSI report; receiving at least one of the plurality of time-domain beam sweeping CSI-RS transmissions in the configured one CSI-RS resource; and transmitting at least one CSI report according to the mapping. In another embodiment, a method in a network node includes determining a CSI-RS resource configuration for one CSI-RS resource; determining a CSI report configuration; and transmitting the plurality of time-domain beam sweeping CSI-RS transmissions in the configured one CSI-RS resource according to the mapping.

16 Claims, 8 Drawing Sheets

(51) Int. Cl.
　　　*H04W 72/0446*　　(2023.01)
　　　*H04W 72/1263*　　(2023.01)
　　　*H04W 72/542*　　(2023.01)
(58) Field of Classification Search
　　　CPC ............... H04B 7/0479; H04B 7/0626; H04B 7/0639
　　　See application file for complete search history.

(56) References Cited

OTHER PUBLICATIONS

3GPP TSG-RAN WG1 Meeting #95; R1-1813992; Source: Ericsson; Title: Summary of Views on CSI Reporting V2; Agenda Item: 7.1.2.2; Document for: Discussion and Decision, Spokane, USA, Nov. 12-16, 2018, consisting of 22 pages.
3GPP TS 38.211 V15.6.0 (Jun. 2019); 3rd Generation Partnership Project; Technical Specification Group Radio Access Network; NR; Physical Channels and Modulation (Release 15), consisting of 97 pages.
3GPP TS 38.214 V15.6.0 (Jun. 2019); 3rd Generation Partnership Project; Technical Specification Group Radio Access Network; NR; Physical Layer Procedures for Data (Release 15), consisting of 105 pages.
3GPP TS 38.306 V15.6.0; 3rd Generation Partnership Project; Technical Specification Group Radio Access Network; NR; User Equipment (UE) Radio Access Capabilities (Release 15), consisting of 53 pages.

\* cited by examiner

METHODS AND APPARATUSES FOR TIME-DOMAIN BEAM-SWEEPING

CROSS-REFERENCE TO RELATED APPLICATIONS

This application is a Submission Under 35 U.S.C. § 371 for U.S. National Stage Patent Application of International Application Number: PCT/IB2019/056547, filed Jul. 31, 2019 entitled "METHODS AND APPARATUSES FOR TIME-DOMAIN BEAM-SWEEPING," the entirety of which is incorporated herein by reference.

TECHNICAL FIELD

Wireless communication and in particular, to methods and apparatuses for time-domain beam-sweeping.

BACKGROUND

Massive multiple-input multiple-output (MIMO) is one technology adopted by $4^{th}$ Generation (4G) Long-Term Evolution (LTE) and $5^{th}$ Generation (5G) New Radio (NR) under the Third Generation Partnership Project (3GPP) to enhance wireless network performance and capacity. A typical massive MIMO system includes two-dimensional antenna elements array with M rows, N columns and K polarizations (K=2 in a case of cross-polarization) as shown, for example, in FIG. 1.

In NR, codebook-based beamforming schemes are widely used for Massive MIMO. In the codebook-based beamforming schemes, a wireless device (WD) provides codebook feedback based on the Channel State Information—Reference Signal (CSI-RS). After receiving the feedback, a network node (e.g., gNB) may use the feedback to perform beamforming and link adaptation.

Different WDs (e.g., user equipments (UEs)) may have different WD capabilities to handle the codebook feedback. In NR, at most 32 CSI-RS ports can be supported. As a general principle, more CSI-RS ports may provide better performance. However, more CSI-RS ports may also introduce more complexity for the WD implementation. In current chipset markets, some WDs support 32 ports, and some WDs only support 8-port CSI-RS, or even 4-port CSI-RS. Thus, existing networks do not provide comparable performance for WDs supporting a limited number of CSI-RS ports.

SUMMARY

Some embodiments advantageously provide methods and apparatuses for time-domain beam-sweeping for wireless communications.

According to one aspect of the present disclosure, a method implemented in a wireless device, WD, is provided. The method includes receiving a Channel State Information—Reference Signal, CSI-RS, resource configuration for one CSI-RS resource. The method includes receiving a CSI report configuration, the CSI-RS resource configuration and the CSI report configuration mapping each of a plurality of time-domain beam sweeping CSI-RS transmissions in the configured one CSI-RS resource to a corresponding CSI report. The method includes receiving at least one of the plurality of time-domain beam sweeping CSI-RS transmissions in the configured one CSI-RS resource. The method includes transmitting at least one CSI report according to the mapping.

In some embodiments of this aspect, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments of this aspect, receiving the CSI report configuration further includes receiving a time domain restriction for channel measurement configuration; and as a result of the time domain restriction for channel measurement configuration, performing a channel measurement for the at least one CSI report, the channel measurement based on a most recently received one of the plurality of time-domain beam sweeping CSI-RS transmissions, the most recently received one of the plurality of time-domain beam sweeping CSI-RS transmissions being no later than the CSI reference resource and being associated with the at least one CSI report. In some embodiments of this aspect, the mapping includes arranging a time slot for each CSI report relative to a time slot for each respective time-domain beam swept CSI-RS transmission. In some embodiments of this aspect, the time slot for each CSI report and the time slot for each respective time-domain beam swept CSI-RS transmission are separated by a gap that is greater than or equal to a threshold value.

In some embodiments of this aspect, the receiving the at least one of the plurality of time-domain beam sweeping CSI-RS transmissions in the configured one CSI-RS resource further includes receiving a first CSI-RS transmission in the configured one CSI-RS resource during a first time slot, the first CSI-RS transmission encoded with a first precoder; and receiving a second CSI-RS transmission in the configured one CSI-RS resource during a second time slot, the second CSI-RS transmission encoded with a second precoder, the second precoder being different from the first precoder and the second time slot occurring after the first time slot. In some embodiments of this aspect, the transmitting at least one CSI report according to the mapping further includes, as a result of receiving the first CSI-RS transmission during the first time slot, transmitting a first CSI report during a third time slot occurring at least a predetermined number, X, of time slots after the first time slot; and as a result of receiving the second CSI-RS transmission during the second time slot, transmitting a second CSI report during a fourth time slot occurring at least a predetermined number, Y, of time slots after the second time slot.

In some embodiments of this aspect, the method further includes communicating with a network node according to link adaptation based at least in part on the transmitted at least one CSI report. In some embodiments of this aspect, the method further includes receiving at least one physical channel, the at least one physical channel based at least in part on at least one of: precoding weights derived at least in part from a precoding matrix indicator associated with a selected one of the at least one CSI report; precoding weights derived at least in part from at least one beamforming weight applied to the CSI-RS transmission associated with a selected one of the at least one CSI report; and a modulation and coding scheme determined according to a selected one of the at least one CSI report by link adaptation.

According to another aspect of the present disclosure, a method implemented in a network node is provided. The method includes determining a Channel State Information—Reference Signal, CSI-RS, resource configuration for one CSI-RS resource. The method includes determining a CSI report configuration, the CSI-RS resource configuration and the CSI report configuration mapping each of a plurality of time-domain beam sweeping CSI-RS transmissions in the configured one CSI-RS resource to a corresponding CSI report. The method includes transmitting the CSI-RS resource configuration and the CSI report configuration. The method includes transmitting the plurality of time-domain beam sweeping CSI-RS transmissions in the configured one CSI-RS resource according to the mapping.

In some embodiments of this aspect, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments of this aspect, transmitting the CSI report configuration further includes transmitting a time domain restriction for channel measurement configuration; and as a result of the time domain restriction for channel measurement configuration, receiving at least one CSI report based on a channel measurement of a most recently transmitted one of the plurality of time-domain beam sweeping CSI-RS transmissions, the most recently transmitted one of the plurality of time-domain beam sweeping CSI-RS transmissions being no later than the CSI reference resource and being associated with the at least one CSI report. In some embodiments of this aspect, the mapping includes arranging a time slot for each CSI report relative to a time slot for each respective time-domain beam swept CSI-RS transmission. In some embodiments of this aspect, the time slot for each CSI report and the time slot for each respective time-domain beam swept CSI-RS transmission are separated by a gap that is greater than or equal to a threshold value.

In some embodiments of this aspect, the transmitting the at least one of the plurality of time-domain beam sweeping CSI-RS transmissions in the configured one CSI-RS resource further includes transmitting a first CSI-RS transmission in the configured one CSI-RS resource during a first time slot, the first CSI-RS transmission encoded with a first precoder; and transmitting a second CSI-RS transmission in the configured one CSI-RS resource during a second time slot, the second CSI-RS transmission encoded with a second precoder, the second precoder being different from the first precoder and the second time slot occurring after the first time slot. In some embodiments of this aspect, the method includes, as a result of transmitting the first CSI-RS transmission during the first time slot, receiving a first CSI report during a third time slot occurring at least a predetermined number, X, of time slots after the first time slot; and as a result of transmitting the second CSI-RS transmission during the second time slot, receiving a second CSI report during a fourth time slot occurring at least a predetermined number, Y, of time slots after the second time slot.

In some embodiments of this aspect, the method further includes receiving at least one CSI report according to the mapping; and communicating with a wireless device according to link adaptation based at least in part on the received at least one CSI report. In some embodiments of this aspect, the method further includes receiving a plurality of CSI reports according to the mapping; selecting one out of the plurality of CSI reports; and at least one of: deriving precoding weights for at least one physical channel based at least in part on a precoding matrix indicator associated with the selected CSI report; deriving precoding weights for the at least one physical channel based at least in part on at least one beamforming weight applied to the CSI-RS transmission associated with the selected CSI report; and determining, by link adaptation, a modulation and coding scheme for the at least one physical channel based at least in part on the selected CSI report.

According to yet another aspect of the present disclosure, a wireless device, WD, configured to communicate with a network node is provided. The WD includes processing circuitry. The processing circuitry is configured to cause the WD to receive a Channel State Information-Reference Signal, CSI-RS, resource configuration for one CSI-RS resource. The processing circuitry is configured to cause the WD to receive a CSI report configuration, the CSI-RS resource configuration and the CSI report configuration mapping each of a plurality of time-domain beam sweeping CSI-RS transmissions in the configured one CSI-RS resource to a corresponding CSI report. The processing circuitry is configured to cause the WD to receive at least one of the plurality of time-domain beam sweeping CSI-RS transmissions in the configured one CSI-RS resource. The processing circuitry is configured to cause the WD to transmit at least one CSI report according to the mapping.

In some embodiments of this aspect, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments of this aspect, the processing circuitry is further configured to cause the WD to receive the CSI report configuration by being configured to receive a time domain restriction for channel measurement configuration; and as a result of the time domain restriction for channel measurement configuration, perform a channel measurement for the at least one CSI report, the channel measurement based on a most recently received one of the plurality of time-domain beam sweeping CSI-RS transmissions, the most recently received one of the plurality of time-domain beam sweeping CSI-RS transmissions being no later than the CSI reference resource and being associated with the at least one CSI report. In some embodiments of this aspect, the mapping includes arranging a time slot for each CSI report relative to a time slot for each respective time-domain beam swept CSI-RS transmission. In some embodiments of this aspect, the time slot for each CSI report and the time slot for each respective time-domain beam swept CSI-RS transmission are separated by a gap that is greater than or equal to a threshold value.

In some embodiments of this aspect, the processing circuitry is further configured to cause the WD to receive the at least one of the plurality of time-domain beam sweeping CSI-RS transmissions in the configured one CSI-RS resource by being configured to cause the WD to receive a first CSI-RS transmission in the configured one CSI-RS resource during a first time slot, the first CSI-RS transmission encoded with a first precoder; and receive a second CSI-RS transmission in the configured one CSI-RS resource during a second time slot, the second CSI-RS transmission encoded with a second precoder, the second precoder being different from the first precoder and the second time slot occurring after the first time slot. In some embodiments of this aspect, the processing circuitry is further configured to transmit at least one CSI report according to the mapping by being configured to cause the WD to: as a result of receiving the first CSI-RS transmission during the first time slot, transmit a first CSI report during a third time slot occurring at least a predetermined number, X, of time slots after the first time slot; and as a result of receiving the second CSI-RS transmission during the second time slot, transmit a second CSI report during a fourth time slot occurring at least a predetermined number, Y, of time slots after the second time slot.

In some embodiments of this aspect, the processing circuitry is further configured to cause the WD to communicate with a network node according to link adaptation based at least in part on the transmitted at least one CSI report. In some embodiments of this aspect, the processing circuitry is further configured to cause the WD to receive at least one physical channel, the at least one physical channel based at least in part on at least one of: precoding weights derived at least in part from a precoding matrix indicator associated with a selected one of the at least one CSI report; precoding weights derived at least in part from at least one beamforming weight applied to the CSI-RS transmission associated with a selected one of the at least one CSI report; and a modulation and coding scheme determined according to a selected one of the at least one CSI report by link adaptation.

According to another aspect of the present disclosure, a network node configured to communicate with a wireless device, WD, is provided. The network node includes processing circuitry. The processing circuitry is configured to cause the network node to determine a Channel State Information—Reference Signal, CSI-RS, resource configuration for one CSI-RS resource. The processing circuitry is configured to cause the network node to determine a CSI report configuration, the CSI-RS resource configuration and the CSI report configuration mapping each of a plurality of time-domain beam sweeping CSI-RS transmissions in the configured one CSI-RS resource to a corresponding CSI report. The processing circuitry is configured to cause the network node to transmit the CSI-RS resource configuration and the CSI report configuration. The processing circuitry is configured to cause the network node to transmit the plurality of time-domain beam sweeping CSI-RS transmissions in the configured one CSI-RS resource according to the mapping.

In some embodiments of this aspect, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments of this aspect, the processing circuitry is further configured to transmit the CSI report configuration be being configured to cause the network node to transmit a time domain restriction for channel measurement configuration; and as a result of the time domain restriction for channel measurement configuration, receive at least one CSI report based on a channel measurement of a most recently transmitted one of the plurality of time-domain beam sweeping CSI-RS transmissions, the most recently transmitted one of the plurality of time-domain beam sweeping CSI-RS transmissions being no later than the CSI reference resource and being associated with the at least one CSI report. In some embodiments of this aspect, the mapping includes arranging a time slot for each CSI report relative to a time slot for each respective time-domain beam swept CSI-RS transmission.

In some embodiments of this aspect, the time slot for each CSI report and the time slot for each respective time-domain beam swept CSI-RS transmission are separated by a gap that is greater than or equal to a threshold value. In some embodiments of this aspect, the processing circuitry is further configured to cause the network node to transmit the at least one of the plurality of time-domain beam sweeping CSI-RS transmissions in the configured one CSI-RS resource by being configured to cause the network node to: transmit a first CSI-RS transmission in the configured one CSI-RS resource during a first time slot, the first CSI-RS transmission encoded with a first precoder; and transmit a second CSI-RS transmission in the configured one CSI-RS resource during a second time slot, the second CSI-RS transmission encoded with a second precoder, the second precoder being different from the first precoder and the second time slot occurring after the first time slot.

In some embodiments of this aspect, the processing circuitry is further configured to cause the network node to as a result of transmitting the first CSI-RS transmission during the first time slot, receive a first CSI report during a third time slot occurring at least a predetermined number, X, of time slots after the first time slot; and as a result of transmitting the second CSI-RS transmission during the second time slot, receive a second CSI report during a fourth time slot occurring at least a predetermined number, Y, of time slots after the second time slot. In some embodiments of this aspect, the processing circuitry is further configured to cause the network node to: receive at least one CSI report according to the mapping; and communicate with a wireless device according to link adaptation based at least in part on the received at least one CSI report. In some embodiments of this aspect, the processing circuitry is further configured to cause the network node to receive a plurality of CSI reports according to the mapping; select one out of the plurality of CSI reports; and at least one of: derive precoding weights for at least one physical channel based at least in part on a precoding matrix indicator associated with the selected CSI report; derive precoding weights for the at least one physical channel based at least in part on at least one beamforming weight applied to the CSI-RS transmission associated with the selected CSI report; and determine, by link adaptation, a modulation and coding scheme for the at least one physical channel based at least in part on the selected CSI report.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
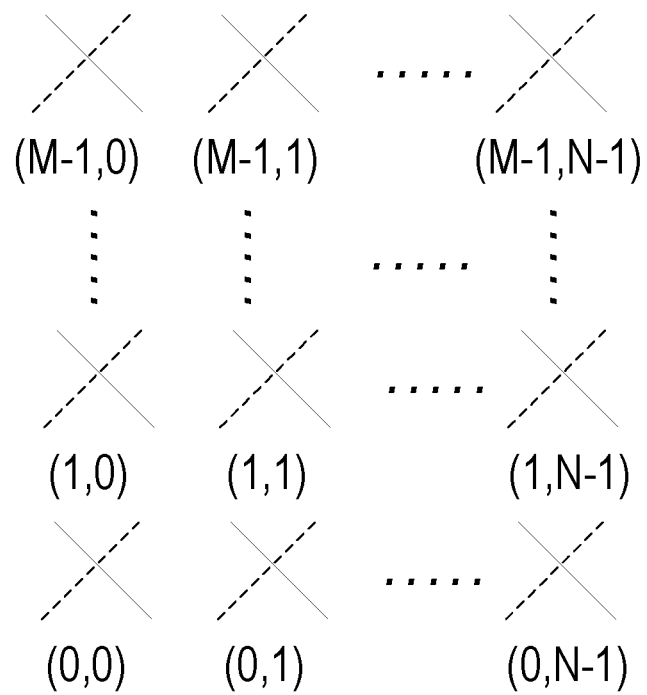
FIG. 1 is a schematic diagram of a two-dimensional antenna element array.

To achieve better performance (e.g., beamforming, link adaptation), from a network node perspective than with other arrangements, use of a maximum number of CSI-RS ports, e.g., 32 CSI-RS ports in NR, is suggested. For 32 CSI-RS ports, a wider beam is used for each CSI-RS port to cover the whole cell. However, due to implementation complexity, some WDs only support 8 CSI-RS ports, or even 4 CSI-RS ports or less. If, for example, only 8 or 4 CSI-RS ports are configured for CSI-RS, the WD and/or network node may generally be expected to experience a significant performance loss (particularly as compared to use of 32 CSI-RS ports in e.g., NR).

For a WD supporting only 8 or 4 CSI-RS ports, in order to achieve a level of performance that is comparable with 32 CSI-RS ports, one solution is to use a multiple-CSI-RS resource approach. With this approach, a plurality of CSI-RS resources is configured, where each CSI-RS resource is configured with a different narrow beam that covers a portion of the cell. In each CSI-RS resource, 8 or 4 CSI-RS ports are configured. However, the precondition for this approach is that WDs support multiple CSI-RS resources. Until recently, many commercial WDs do not support this feature of multiple CSI-RS resources either.

Thus, some embodiments of the present disclosure may provide for performance improvement for a WD supporting 8 or 4 CSI-RS ports and/or may also provide performance improvement for a WD supporting use of a single CSI-RS resource.

Certain aspects of the present disclosure may provide a method for network node transmissions to WDs with limited CSI report capability. In some embodiments, a method implemented by e.g., a network node, includes one or more of the following:
1) Configuring one CSI-RS resource and performing time-domain beam sweeping for CSI-RS in the configured CSI-RS resource; and/or
2) Configuring TimeRestrictionForChannelMeasurements and/or timing CSI-RS transmissions and corresponding CSI reporting so that a WD's CSI report is e.g., one-to-one mapped to a beamformed CSI-RS transmission.
Some of the embodiments provided in the present disclosure may have one or more of the following advantages:
1) support for WDs with limited CSI report capability while also providing good performance, e.g., performance comparable to 32 CSI-RS port performance;
2) low complexity implementation for e.g., low capability WDs.

In some embodiments of the present disclosure, an improvement over existing techniques may include better beamforming gain, as each CSI-RS transmission is beamformed with narrow beamforming weights so that a fraction of the cell is coved. All M sweeping beams may ensure the whole cell is covered over time. This may also be referred to as so-called virtual sectorization and that fraction of the cell may be referred to a virtual sector. Using the same number of CSI-RS ports, the spatial granularity of a precoding matrix indicator (PMI) in a smaller virtual sector may be higher than when the PMI is covering the whole cell (e.g., using one 8 CSI-RS port resource, and 4 sweeping precoding vectors or 4 virtual sectors, the spatial granularity of PMI coverage is similar to that when using one 32 CSI-RS port resource to cover the whole cell; the beamforming performance may also be similar based on simulations and analysis). Some embodiments of the arrangements proposed by the present disclosure can also be used to improve other aspects of the system as compared with other solutions, e.g., link adaptation, if CSI-RS resource is configured differently, or beamformed differently.

Before describing in detail exemplary embodiments, it is noted that the embodiments reside primarily in combinations of apparatus components and processing steps related to methods and apparatuses for time-domain beam-sweeping. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

The term "mapping" is used herein and may indicate a predetermined and/or predefined rule and/or configuration for which resource(s) a transmitter and receiver will arrange for one or more physical channels and/or signals and/or signaling. For example, in one embodiment, one or more configurations (e.g., resource and report configurations) map a corresponding CSI report to a CSI-RS transmission.

Although the description herein may be explained in the context of CSI-RS and CSI-RS measurements and reports, it should be understood that the principles may also be applicable to other reference signals and/or measurements, such as, for example, a synchronization signal block (SSB).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Any two or more embodiments described in this disclosure may be combined in any way with each other.

A resource may generally indicate time-frequency resource (or range/s in time-frequency space), in particular a resource structure, e.g. a resource structure comprising one or more resource elements. A resource may be part of a resource pool or a resource set comprising one or a plurality of resources, which may be configured for downlink or uplink transmission. Different resources may be different in size, e.g. range in frequency and/or time space. Different resources may be considered to pertain to, and/or be scheduled for, the same time structure/TTI, e.g., to the same slot or mini-slot or shortened slot. A resource pool/set may be configured for a plurality of time structures/TTIs. The resource set may be configured by the network node. A resource and/or resource set may be represented and/or configured according to a configuration, such as, for example, CSI-RS resource configuration and/or CSI report configuration transmitted in e.g., radio resource control (RRC) signalling. Downlink control information (DCI) may be used to activate and/or de-activate the configured resources.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The measurements may be channel state information (CSI) measurements performed on reference signals, such as, CSI-RS and/or synchronization signals.

Generally, it may be considered that the network, e.g. a signaling radio node and/or node arrangement, configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) information, such as control and/or configuration information may comprise receiving one or more control information and/or configuration messages (e.g., an RRC parameter). It may be considered that receiving control and/or configuration signaling comprises demodulating and/or decoding and/or detecting, e.g. blind detection of, one or more messages, in particular a message carried by the signaling, e.g. based on an assumed set of resources, which may be searched and/or listened for the information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Configuring a radio node, in particular a terminal or WD, may refer to the radio node being adapted or caused or set and/or instructed to operate according to the configuration (e.g., CSI-RS resource configuration, CSI reporting configuration, etc.). Configuring may be performed by another device, e.g., a network node (for example, a base station or gNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., the indication of the resource allocation as discussed above). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, acknowledgement signaling, and/or configuring resources and/or a resource set therefor. In particular, configuring a terminal (e.g. WD) may comprise configuring the WD to perform certain measurements on certain radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
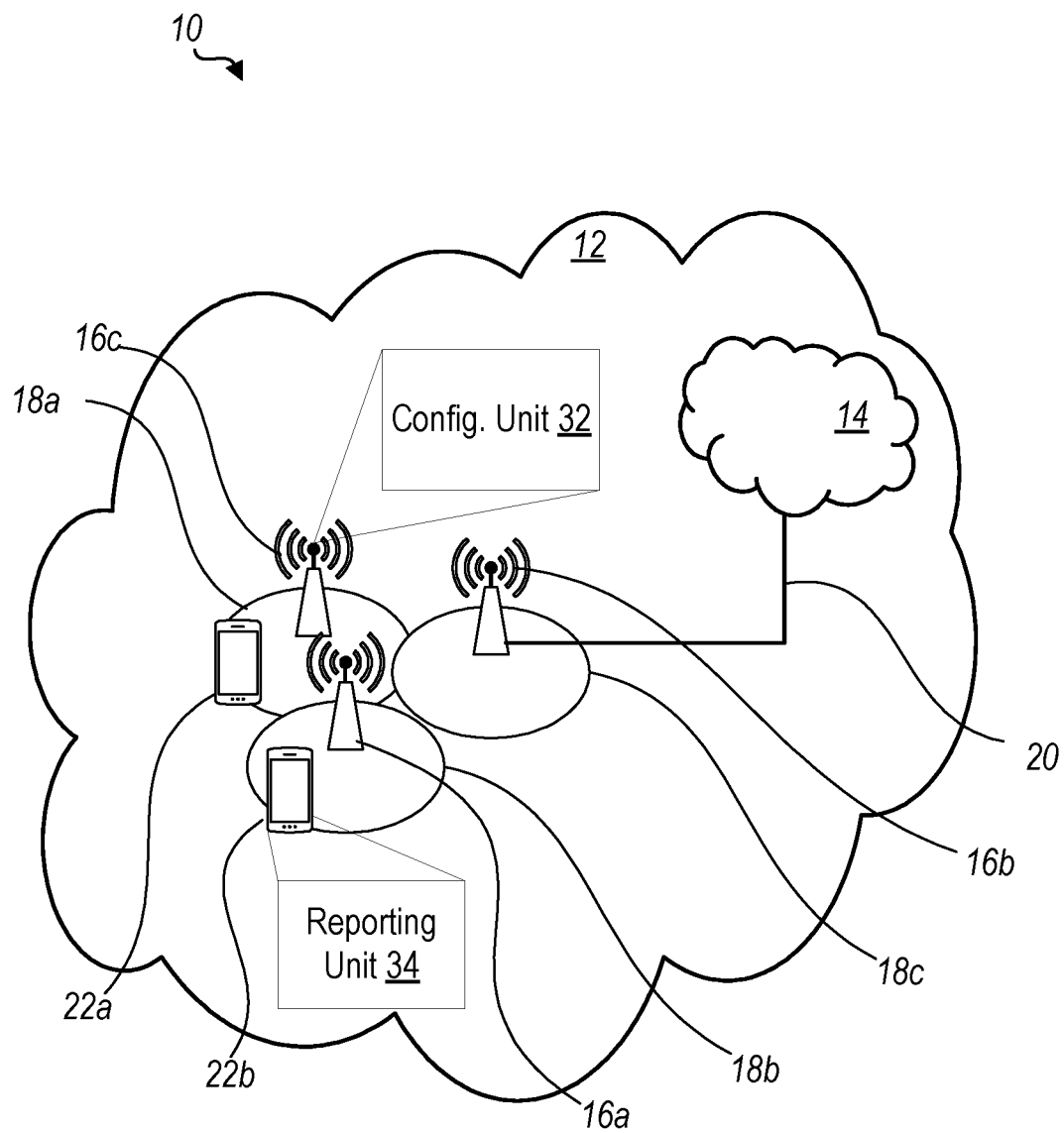
FIG. 2 is a schematic diagram of an exemplary network architecture illustrating a communication system connected via an intermediate network according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18*a* is configured to wirelessly connect to, or be paged by, the corresponding network node 16*c*. A second WD 22*b* in coverage area 18*b* is wirelessly connectable to the corresponding network node 16*a*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a Configuration unit 32 which is configured to at least one of: determine a Channel State Information—Reference Signal, CSI-RS, resource configuration for one CSI-RS resource; determine a CSI report configuration, the CSI-RS resource configuration and the CSI report configuration mapping each of a plurality of time-domain beam sweeping CSI-RS transmissions in the configured one CSI-RS resource to a corresponding CSI report; transmit the CSI-RS resource configuration and the CSI report configuration; and transmit the plurality of time-domain beam sweeping CSI-RS transmissions in the configured one CSI-RS resource according to the mapping.

A wireless device 22 is configured to include a Reporting unit 34 which is configured to at least one of: receive a Channel State Information—Reference Signal, CSI-RS, resource configuration for one CSI-RS resource; receive a CSI report configuration, the CSI-RS resource configuration and the CSI report configuration mapping each of a plurality of time-domain beam sweeping CSI-RS transmissions in the configured one CSI-RS resource to a corresponding CSI report; receive at least one of the plurality of time-domain beam sweeping CSI-RS transmissions in the configured one CSI-RS resource; and transmit at least one CSI report according to the mapping.

Example implementations, in accordance with an embodiment, of the WD 22 and the network node 16 discussed in the preceding paragraphs will now be described with reference to FIG. 3. In a communication system 10, a network node 16 provided in a communication system 10 and including hardware 58 enabling it to communicate with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include Configuration unit 32 configured to perform network node methods discussed herein, such as, for example, the methods discussed with reference to FIG. 4 and throughout the present disclosure.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22. In providing the service to the user, the client application 92 may receive request data and provide user data in response to the request data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a Reporting unit 34 configured to configured to perform WD methods discussed herein, such as, for example, the methods discussed with reference to FIG. 5 and throughout the present disclosure.

Figure 3:
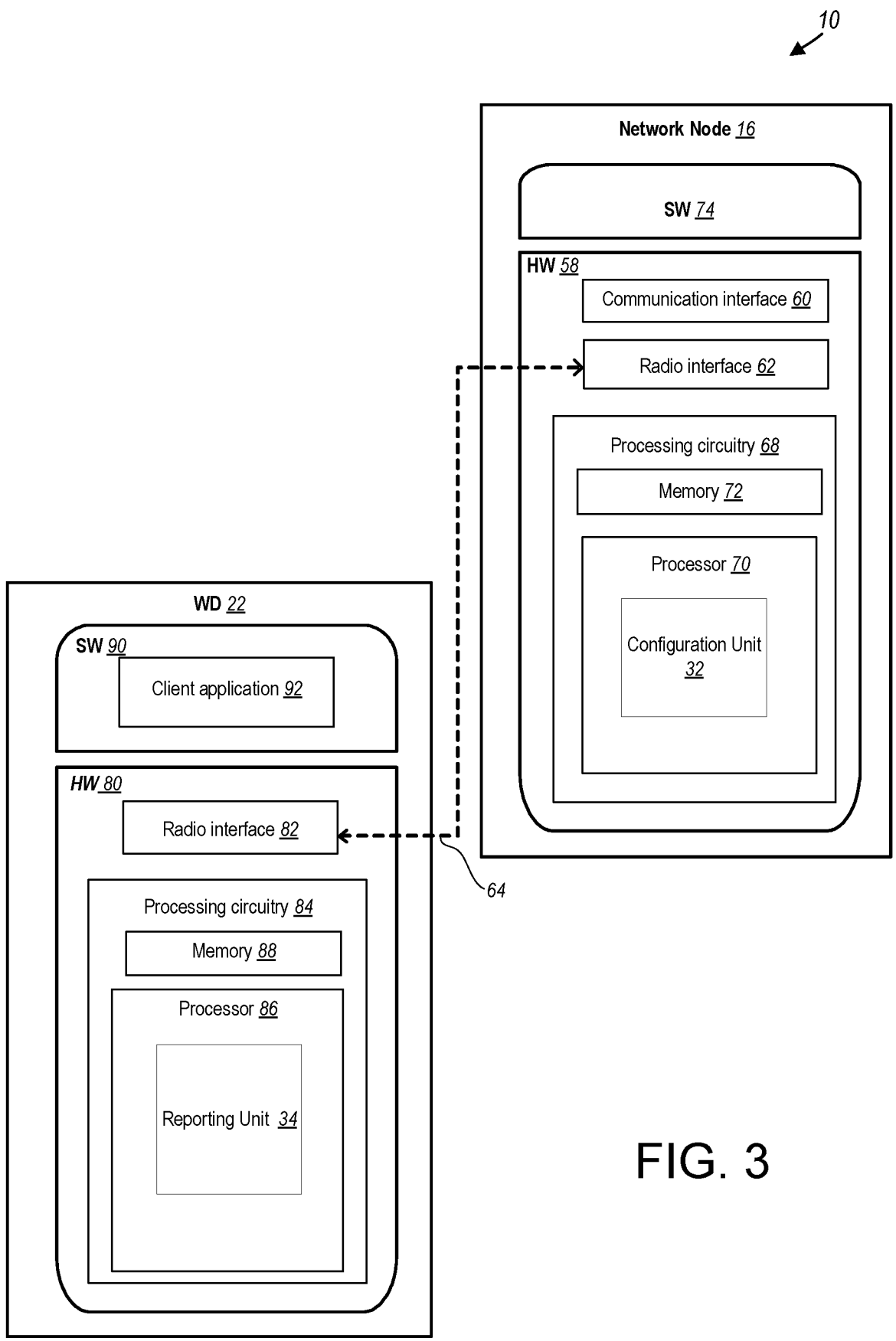
FIG. 3 is a block diagram of a network node in communication with a wireless device over an at least partially wireless connection according to some embodiments of the present disclosure.

In some embodiments, the inner workings of the network node 16 and WD 22 may be as shown in FIG. 3 and independently, the surrounding network topology may be that of FIG. 2.

In FIG. 3, the connection between the wireless device 22 and the network node 16 is shown without explicit reference to any intermediary devices and the precise routing of messages via these devices. Network infrastructure may determine the routing, which it may be configured to hide from the WD 22 or from a service provider, or both. The network infrastructure may further take decisions by which it dynamically changes the routing (e.g., on the basis of load balancing consideration or reconfiguration of the network).

Although FIGS. 2 and 3 show various "units" such as Configuration unit 32, and Reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
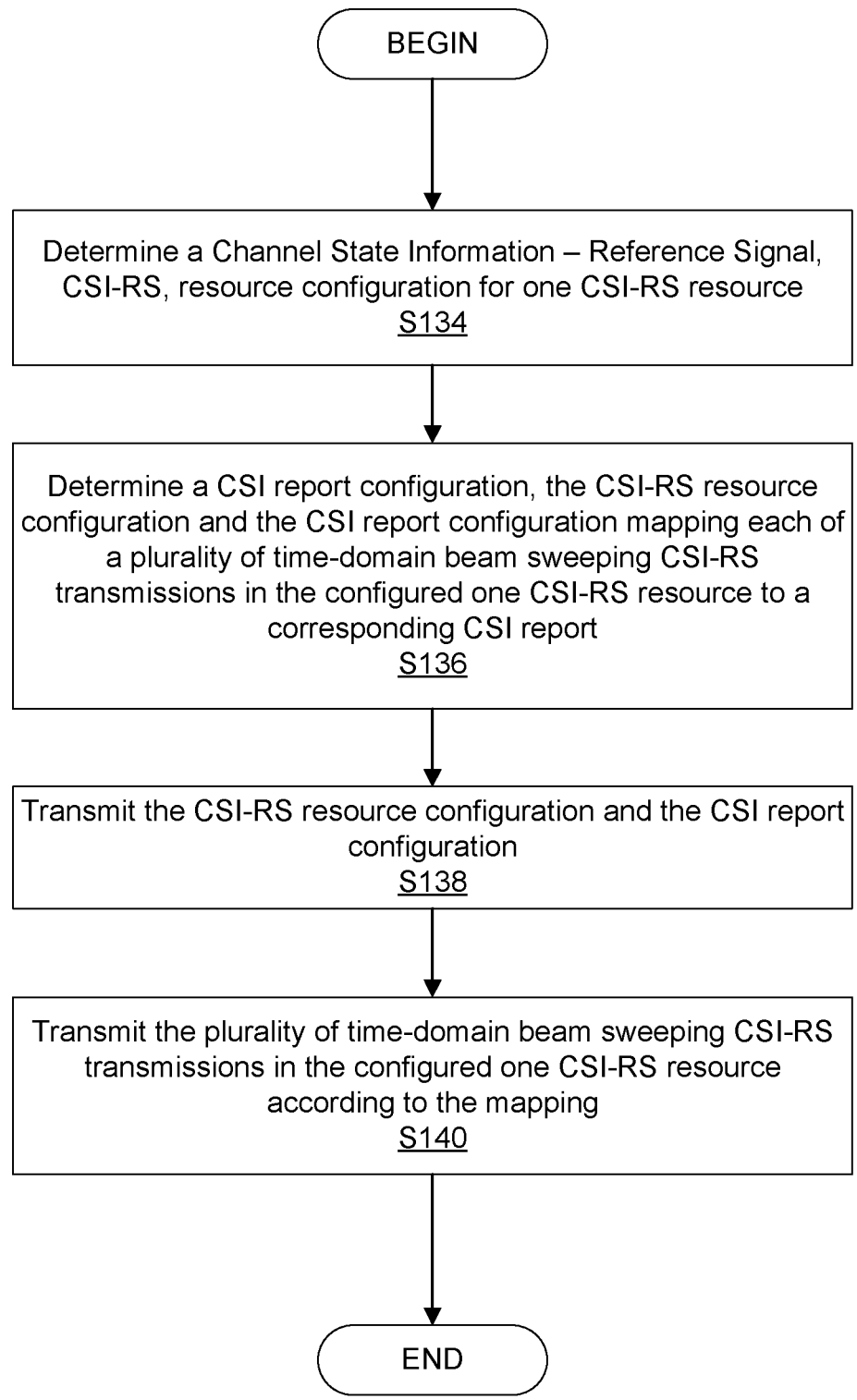
FIG. 4 is a flowchart of an exemplary process in a network node for Configuration unit according to some embodiments of the present disclosure.

FIG. 4 is a flowchart of an exemplary process in a network node 16 for time-domain beam sweeping and configuring a WD according to some embodiments of the present disclosure. One or more Blocks and/or functions and/or methods performed by the network node 16 may be performed by one or more elements of network node 16 such as by Configuration unit 32 in processing circuitry 68, processor 70, radio interface 62, etc. according to the example method. The example method includes determining (Block S134), such as via Configuration unit 32, processing circuitry 68, processor 70 and/or radio interface 62, a Channel State Information-Reference Signal, CSI-RS, resource configuration for one CSI-RS resource. The method includes determining (Block S136), such as via Configuration unit 32, processing circuitry 68, processor 70 and/or radio interface 62, a CSI report configuration. The CSI-RS resource configuration and the CSI report configuration maps each of a plurality of time-domain beam sweeping CSI-RS transmissions in the configured one CSI-RS resource to a corresponding CSI report. The method includes transmitting (Block S138), such as via Configuration unit 32, processing circuitry 68, processor 70 and/or radio interface 62, the CSI-RS resource configuration and the CSI report configuration. The method includes transmitting (Block S140), such as via Configuration unit 32, processing circuitry 68, processor 70 and/or radio interface 62, the plurality of time-domain beam sweeping CSI-RS transmissions in the configured one CSI-RS resource according to the mapping.

In some embodiments, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments, transmitting the CSI report configuration further includes transmitting, such as via Configuration unit 32, processing circuitry 68, processor 70 and/or radio interface 62, a time domain restriction for channel measurement configuration; and as a result of the time domain restriction for channel measurement configuration, receiving, such as via Configuration unit 32, processing circuitry 68, processor 70 and/or radio interface 62, at least one CSI report based on a channel measurement of a most recently transmitted one of the plurality of time-domain beam sweeping CSI-RS transmissions, the most recently transmitted one of the plurality of time-domain beam sweeping CSI-RS transmissions being no later than the CSI reference resource and being associated with the at least one CSI report.

In some embodiments, the mapping includes arranging, such as via Configuration unit 32, processing circuitry 68, processor 70 and/or radio interface 62, a time slot for each CSI report relative to a time slot for each respective time-domain beam swept CSI-RS transmission. In some embodiments, the time slot for each CSI report and the time slot for each respective time-domain beam swept CSI-RS transmission are separated by a gap that is greater than or equal to a threshold value. In some embodiments, the transmitting the at least one of the plurality of time-domain beam sweeping CSI-RS transmissions in the configured one CSI-RS resource further includes: transmitting, such as via Configuration unit 32, processing circuitry 68, processor 70 and/or radio interface 62, a first CSI-RS transmission in the configured one CSI-RS resource during a first time slot, the first CSI-RS transmission encoded with a first precoder; and transmitting, such as via Configuration unit 32, processing circuitry 68, processor 70 and/or radio interface 62, a second CSI-RS transmission in the configured one CSI-RS resource during a second time slot, the second CSI-RS transmission encoded with a second precoder, the second precoder being different from the first precoder and the second time slot occurring after the first time slot.

In some embodiments, the method further includes as a result of transmitting the first CSI-RS transmission during the first time slot, receiving, such as via Configuration unit 32, processing circuitry 68, processor 70 and/or radio interface 62, a first CSI report during a third time slot occurring at least a predetermined number, X, of time slots after the first time slot. In some embodiments, the method further includes as a result of transmitting the second CSI-RS transmission during the second time slot, receiving, such as via Configuration unit 32, processing circuitry 68, processor 70 and/or radio interface 62, a second CSI report during a fourth time slot occurring at least a predetermined number, Y, of time slots after the second time slot. In some embodiments, the method further includes receiving, such as via Configuration unit 32, processing circuitry 68, processor 70 and/or radio interface 62, at least one CSI report according to the mapping. In some embodiments, the method further includes communicating, such as via Configuration unit 32, processing circuitry 68, processor 70 and/or radio interface 62, with a wireless device 22 according to link adaptation based at least in part on the received at least one CSI report.

In some embodiments, the method further includes receiving, such as via Configuration unit 32, processing circuitry 68, processor 70 and/or radio interface 62, a plurality of CSI reports according to the mapping. In some embodiments, the method further includes selecting, such as via Configuration unit 32, processing circuitry 68, processor 70 and/or radio interface 62, one out of the plurality of CSI reports. In some embodiments, the method further includes at least one of: deriving, such as via Configuration unit 32, processing circuitry 68, processor 70 and/or radio interface 62, precoding weights for at least one physical channel based at least in part on a precoding matrix indicator associated with the selected CSI report; deriving precoding weights for the at least one physical channel based at least in part on at least one beamforming weight applied to the CSI-RS transmission associated with the selected CSI report; and determining, such as via Configuration unit 32, processing circuitry 68, processor 70 and/or radio interface 62, by link adaptation, a modulation and coding scheme for the at least one physical channel based at least in part on the selected CSI report.

Figure 5:
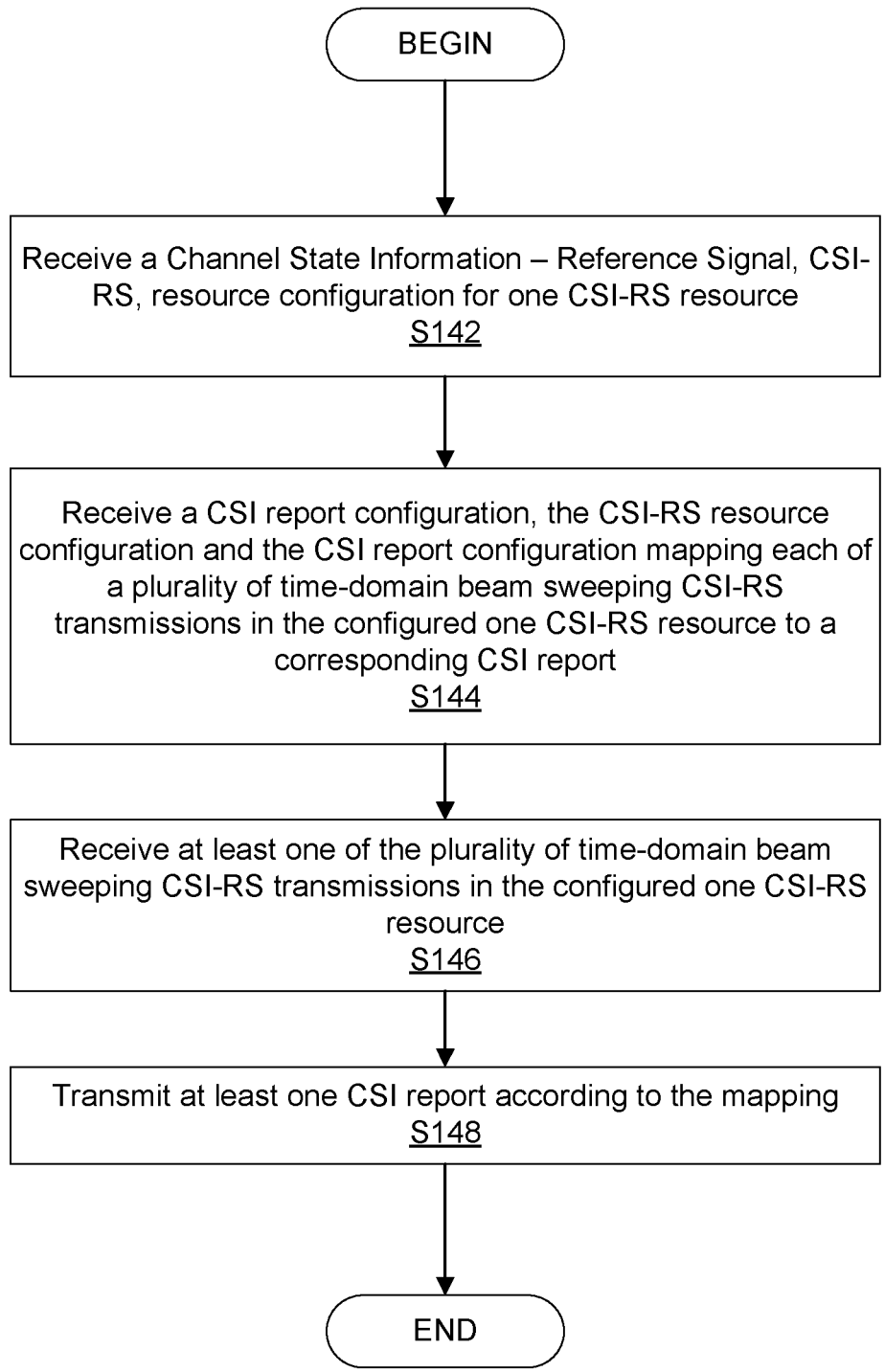
FIG. 5 is a flowchart of an exemplary process in a wireless device for Reporting unit according to some embodiments of the present disclosure.

FIG. 5 is a flowchart of an exemplary process in a wireless device 22 for reporting measurements according to some embodiments of the present disclosure. One or more Blocks and/or functions and/or methods performed by WD 22 may be performed by one or more elements of WD 22 such as by Reporting unit 34 in processing circuitry 84, processor 86, radio interface 82, etc. The example method includes receiving (Block S142), such as via Reporting unit 34, processing circuitry 84, processor 86 and/or radio interface 82, a Channel State Information—Reference Signal, CSI-RS, resource configuration for one CSI-RS resource. The method includes receiving (Block S144), such as via Reporting unit 34, processing circuitry 84, processor 86 and/or radio interface 82, a CSI report configuration, the CSI-RS resource configuration and the CSI report configuration mapping each of a plurality of time-domain beam sweeping CSI-RS transmissions in the configured one CSI-RS resource to a corresponding CSI report. The method includes receiving (Block S146), such as via Reporting unit 34, processing circuitry 84, processor 86 and/or radio interface 82, at least one of the plurality of time-domain beam sweeping CSI-RS transmissions in the configured one CSI-RS resource. The method includes transmitting (Block S148), such as via Reporting unit 34, processing circuitry 84, processor 86 and/or radio interface 82, at least one CSI report according to the mapping.

In some embodiments, the plurality of time-domain beam sweeping CSI-RS transmissions includes a plurality of CSI-RS transmissions, each CSI-RS transmission being beamformed with a different precoder and transmitted in the configured one CSI-RS resource. In some embodiments, receiving the CSI report configuration further comprises receiving, such as via Reporting unit 34, processing circuitry 84, processor 86 and/or radio interface 82, a time domain restriction for channel measurement configuration; and as a result of the time domain restriction for channel measurement configuration, performing, such as via Reporting unit 34, processing circuitry 84, processor 86 and/or radio interface 82, a channel measurement for the at least one CSI report, the channel measurement based on a most recently received one of the plurality of time-domain beam sweeping CSI-RS transmissions. The most recently received one of the plurality of time-domain beam sweeping CSI-RS transmissions may be no later than the CSI reference resource and may be associated with the at least one CSI report. In some embodiments, the mapping includes arranging, such as via Reporting unit 34, processing circuitry 84, processor 86 and/or radio interface 82, a time slot for each CSI report relative to a time slot for each respective time-domain beam swept CSI-RS transmission.

In some embodiments, the time slot for each CSI report and the time slot for each respective time-domain beam swept CSI-RS transmission are separated by a gap that is greater than or equal to a threshold value. In some embodiments, the receiving the at least one of the plurality of time-domain beam sweeping CSI-RS transmissions in the configured one CSI-RS resource further includes receiving, such as via Reporting unit 34, processing circuitry 84, processor 86 and/or radio interface 82, a first CSI-RS transmission in the configured one CSI-RS resource during a first time slot, the first CSI-RS transmission encoded with a first precoder; and receiving, such as via Reporting unit 34, processing circuitry 84, processor 86 and/or radio interface 82, a second CSI-RS transmission in the configured one CSI-RS resource during a second time slot, the second CSI-RS transmission encoded with a second precoder, the second precoder being different from the first precoder and the second time slot occurring after the first time slot.

In some embodiments, the transmitting at least one CSI report according to the mapping further includes as a result of receiving the first CSI-RS transmission during the first time slot, transmitting, such as via Reporting unit 34, processing circuitry 84, processor 86 and/or radio interface 82, a first CSI report during a third time slot occurring at least a predetermined number, X, of time slots after the first time slot; and as a result of receiving the second CSI-RS transmission during the second time slot, transmitting, such as via Reporting unit 34, processing circuitry 84, processor 86 and/or radio interface 82, a second CSI report during a fourth time slot occurring at least a predetermined number, Y, of time slots after the second time slot. In some embodiments, the method further includes communicating, such as via Reporting unit 34, processing circuitry 84, processor 86 and/or radio interface 82, with a network node 16 according to link adaptation based at least in part on the transmitted at least one CSI report.

In some embodiments, the method further includes receiving, such as via Reporting unit 34, processing circuitry 84, processor 86 and/or radio interface 82, at least one physical channel, the at least one physical channel based at least in part on at least one of: precoding weights derived at least in part from a precoding matrix indicator associated with a selected one of the at least one CSI report; precoding weights derived at least in part from at least one beamforming weight applied to the CSI-RS transmission associated with a selected one of the at least one CSI report; and a modulation and coding scheme determined according to a selected one of the at least one CSI report by link adaptation.

Having generally described arrangements related to time-domain beam sweeping, functions and processes are provided as follows, and which may be implemented by the network node 16 and wireless device 22.

Figure 6:
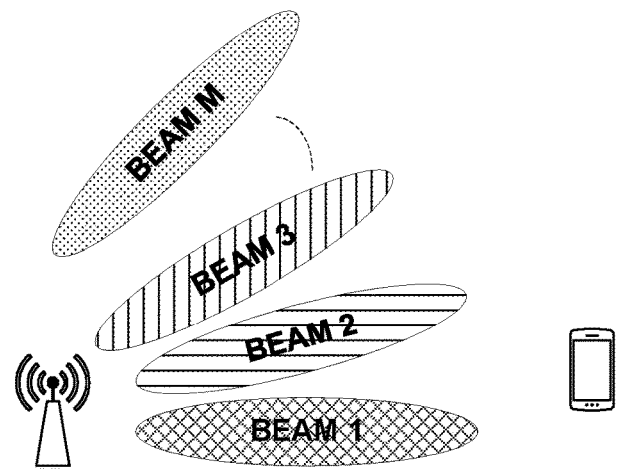
FIG. 6 is an example in which one cell is covered by multiple beams.

In some embodiments, it may be assumed that the network node 16 (e.g., gNB) uses M beams (e.g., M different beamforming weights over different time periods, such as over M time slots) to cover one cell, which is shown, for example, in FIG. 6.

Figure 7:
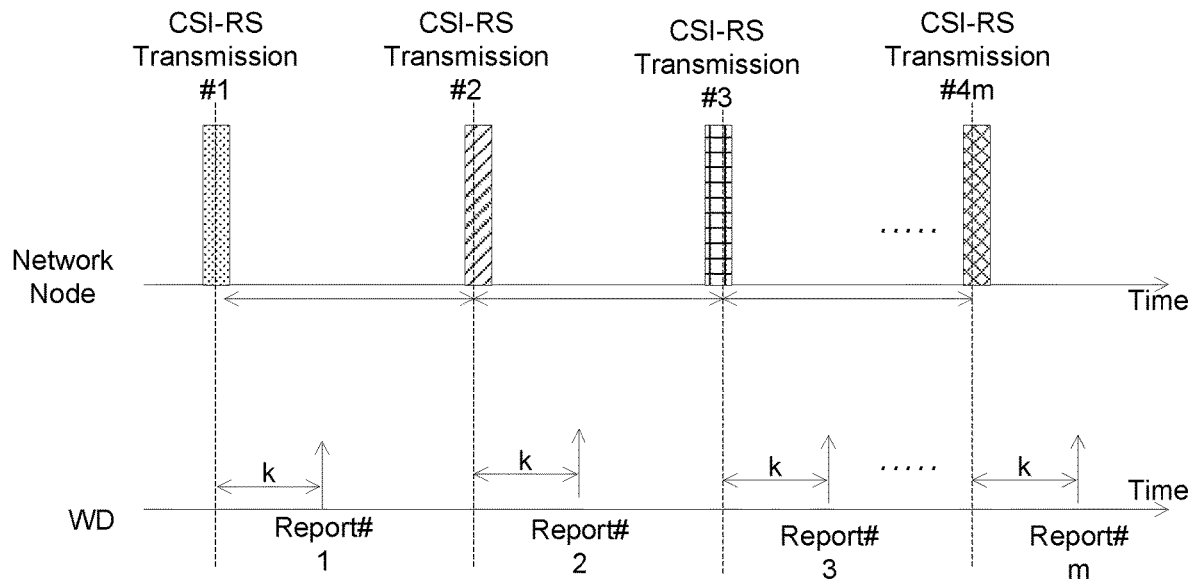
FIG. 7 illustrates an example of a beam sweep in time domain for CSI-RS according to some embodiments of the present disclosure.

In some embodiments, the network node 16 may cause a beam to sweep in time-domain for CSI-RS transmission, as shown, for example, in FIG. 7. The network node 16 may configure one CSI-RS resource for one or more WDs 22 via e.g., radio resource control (RRC) signaling. In some embodiments, in the configured CSI-RS resource, the network node 16 may transmit CSI-RS with periodicity T. For different CSI-RS transmissions (e.g., each beamformed CSI-RS transmission), different beamforming precoders may be applied. For example, in the first CSI-RS transmission (e.g., CSI-RS transmission #1), a first precoder is used and in the second CSI-RS transmission (e.g., CSI-RS transmission #2), a second precoder is applied (that is different from the first precoder), and so on, up to the mth CSI-RS transmission. For each CSI-RS transmission, one CSI report may be received/obtained from the WD 22. FIG. 7 illustrates that, in this example, for each CSI-RS transmission, a corresponding CSI-RS report (e.g., up to the mth CSI-RS report) may be received from the WD 22 according to, for example, a one-to-one mapping that may be configured by the network node 16. In order to avoid an ambiguity as to which CSI-report corresponds to which CSI-RS transmission and/or which precoder is used for each CSI-RS, in some embodiments, the one-to-one mapping between a CSI report and a CSI-RS transmission may be used and/or configured. For example, in order to provide such one-to-one mapping, one or more of the following configurations may be setup by network node 16 and/or WD 22.

Time Restrictions for Channel Measurements

In some embodiments, in order to, for example, avoid the WD 22 performing an averaging of the channel across multiple beamformed CSI-RS transmissions, a parameter that time restricts the WD channel measurement (e.g., timeRestrictionForChannelMeasurements) may be configured using, for example, a CSI report configuration (e.g., CSI-ReportConfig). Based on 3GPP Technical Specification (TS) 38.214, if a WD 22 is configured (e.g., by network node 16) with a higher layer parameter timeRestrictionForChannelMeasurements in CSI-ReportConfig, the WD 22 may derive the channel measurements for computing CSI reported in uplink slot n based only on the most recent, no later than the CSI reference resource, occasion of Non-zero Power (NZP) CSI-RS (defined in TS 38.211) associated with the CSI resource setting. Based on this configuration, the WD 22 may not average the CSI across multiple beams. If the appropriate timeRestrictionForChannelMeasurements is not configured in CSI-ReportConfig, the feedback provided in the report may be an average feedback, which may not be desired.

Time Synchronizing CSI-RS Resource Transmission and CSI Reporting

In some embodiments, to provide a one-to-one mapped feedback, the CSI report may be synchronized with the CSI-RS resource transmission. As described above, if a WD 22 is configured with a higher layer parameter timeRestrictionForChannelMeasurements in CSI-ReportConfig, the WD 22 may derive the channel measurements for computing CSI reported in uplink slot n based on only the most recent, no later than the CSI reference resource, occasion (e.g., frequency/time resource) of NZP CSI-RS associated with the CSI resource setting, e.g., a number of Physical Resource Blocks (PRBs) in frequency domain and a slot in time domain. A CSI-RS resource may be considered the CSI reference signal configured and transmitted in the PRBs/slot defined by a CSI reference resource for the associated CSI report. According to the CSI reference resource definition, in time domain, the CSI reference resource for a CSI reporting in uplink slot n is defined by a single downlink slot $n-n_{CSI\_ref}$, where for periodic and semi-persistent CSI reporting, if a single CSI-RS resource is configured for channel measurement, $n_{CSI\_ref}$ is the smallest value greater than or equal to 4 slots, such that it (e.g., slot $n-_{CSI\_ref}$) corresponds to a valid downlink slot. Based on this, for periodic and semi-persistent CSI reporting, the gap (k time resources (e.g., k slots)) between the report and the corresponding CSI-RS transmission may be larger than (or equal to) 4. Thus, in some embodiments, k=4 may be considered a threshold value. If k≥4, each CSI report may be associated with a specific CSI-RS transmission (see e.g., FIG. 7). In other embodiments, there may be other threshold values for a minimum gap length. In other embodiments, a similar timing gap and/or one-to-one feedback mapping may be achieved in aperiodic CSI reporting.

For example, in some embodiments, for aperiodic CSI reporting, if the WD 22 is indicated by the DCI (e.g., DCI format 0_1) to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $\lfloor Z'/N_{symb}^{slot} \rfloor$, such that slot $n-n_{CSI\_ref}$ corresponds to a valid downlink slot, where Z' corresponds to the delay requirement as defined in Subclause 5.4 of Technical Specification (TS) 38.214, as follows:

Z' may be defined as:

$$Z' = \max(Z'(m)), \text{ where M is the number of updated CSI report(s) according to } m=0, \ldots, M-1$$

Subclause 5.2.1.6, (Z(m),Z'(m)) corresponds to the m-th updated CSI report and is defined as:

- $(Z_1,Z'_1)$ of the table 5.4-1 if the CSI is triggered without a PUSCH with either transport block or HARQ-ACK or both when L=0 CPUs are occupied (according to Subclause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_1,Z'_1)$ of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
- $(Z_3,Z'_3)$ of the table 5.4-2 if reportQuantity is set to 'cri-RSRP' or 'ssb-Index-RSRP', where Xμ is according to UE reported capability beamReportTiming and $KB_l$ is according to UE reported capability beamSwitchTiming as defined in [13, TS 38.306], or
- $(Z_2,Z'_2)$ of table 5.4-2 otherwise.

μ of table 5.4-1 and table 5.4-2 corresponds to the min $(\mu_{PDCCH}, \mu_{CSI-RS}, \mu_{UL})$ where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI.

TABLE 5.4-1

| CSI computation delay requirement 1 | | |
|---|---|---|
| | $Z_1$ [symbols] | |
| μ | $Z_1$ | $Z'_1$ |
| 0 | 10 | 8 |
| 1 | 13 | 11 |

TABLE 5.4-1-continued

| CSI computation delay requirement 1 | | |
|---|---|---|
| | $Z_1$ [symbols] | |
| μ | $Z_1$ | $Z'_1$ |
| 2 | 25 | 21 |
| 3 | 43 | 36 |

TABLE 5.4-2

| CSI computation delay requirement 2 | | | | | |
|---|---|---|---|---|---|
| $Z_1$ [symbols] | | $Z_2$ [symbols] | | $Z_3$ [symbols] | |
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min (44, $X_3$ + $KB_1$) | $X_3$ |
| 3 | 97 | 85 | 152 | 140 | min (97, $X_4$ + $KB_2$) | $X_4$ |

By configuring the time restriction for channel measurement and/or setting an appropriate gap (e.g., k≥4, or other threshold value or other predetermined number of slots or other time resources, etc.) between each report (e.g., reporting in uplink slot n) and the corresponding CSI-RS transmission (e.g., transmitting CSI-RS in downlink slot $n-n_{CSI\_ref}$) on which the report is based, some embodiments of the present disclosure may improve performance (e.g., link adaptation) even for WDs 22 having and/or using reduced capabilities, such as using 4 or 8-port CSI-RS (instead of e.g., 32-port CSI-RS) and/or occupying a single resource (e.g., CSI-RS resource).

Figure 8:
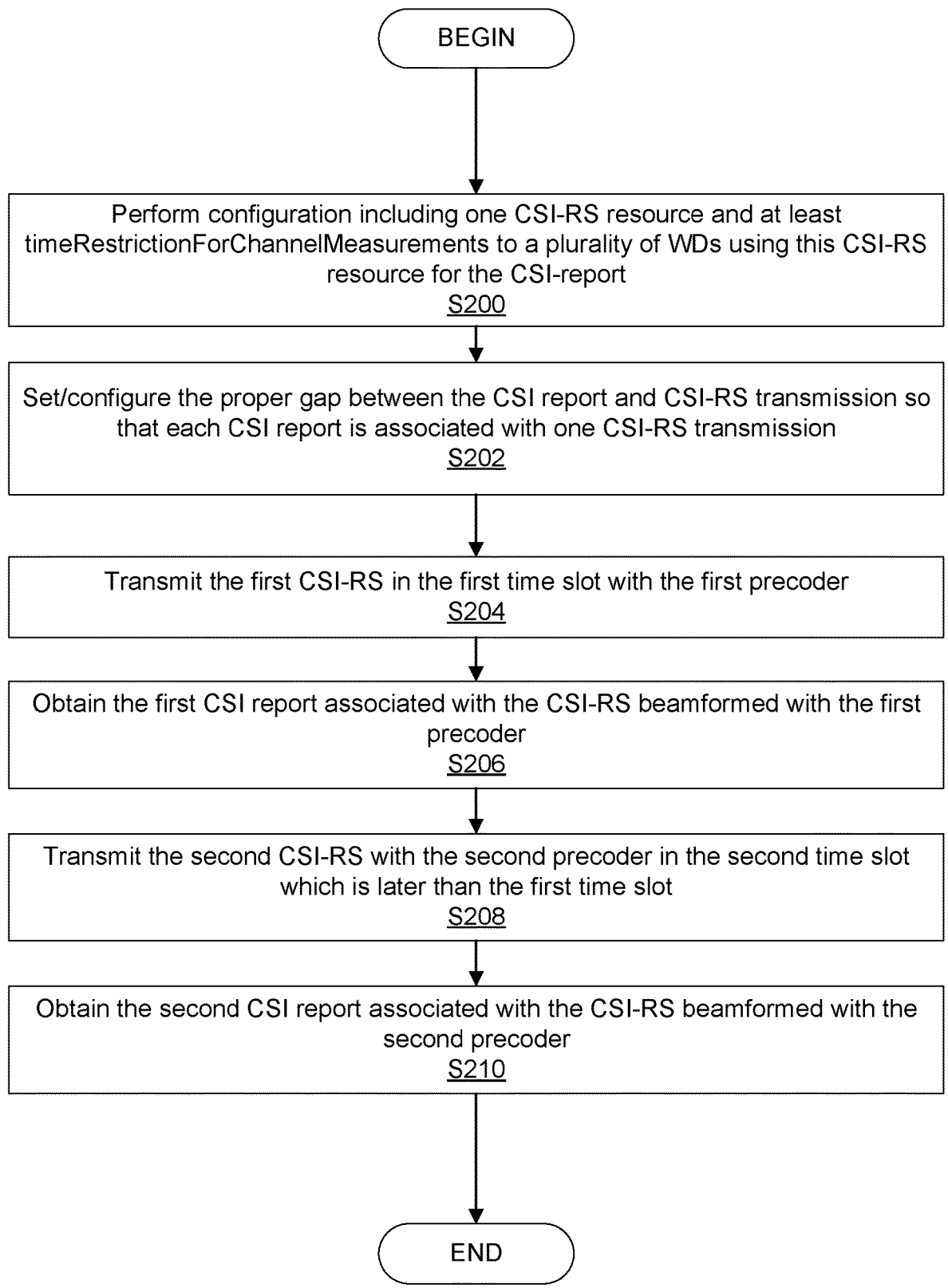
FIG. 8 is a flowchart of an example implementation of beam time domain sweeping according to some embodiments of the present disclosure.

FIG. 8 is a flowchart illustrating yet another embodiment of the present disclosure. For one or more WDs 22 supporting and/or using only one CSI-RS resource and a limited number of CSI-RS antenna ports, in step S200, the network node 16 configures the CSI-RS resource (e.g., one CSI-RS resource, NZP CSI-RS resource set having a single resource) for the one or more WDs 22. In some embodiments, the CSI-RS resource may be configured via e.g., CSI-ResourceConfig. In some embodiments, the network node 16 may configure the CSI-RS resource according to, one or more of the following parameters, such as, periodicity, offset, number of ports, position, etc. so that, for example, the CSI-RS is transmitted such that there is a one-to-one mapping between a CSI-RS transmission in the downlink (DL) and a corresponding CSI feedback/report in the uplink (UL).

In step 202, a gap (e.g., k≥4, or other threshold value or other predetermined number of slots or other time resources, etc.) between the CSI report and each CSI-RS transmission is configured/set by e.g., network node 16 so that each CSI report is associated with and/or mapped relative to one CSI-RS transmission. In some embodiments, network node 16 may configure the WD 22 in a CSI-ReportConfig message (e.g., via radio resource control (RRC) signalling). In CSI-ReportConfig, periodicity and Offset of the CSI report may be configured by network node 16 so that each CSI report is associated with one CSI-RS transmission. For example, for periodic or semi-persistent CSI reporting, the gap between CSI report and CSI-RS transmission may be configured to be larger than, or equal to 4 slots. With this setup, a one-to-one mapping between CSI report and CSI-RS transmission may be provided. In some embodiments, in the CSI-ReportConfig, timeRestrictionForChannelMeasurements may be set to "configured" by network node 16. Once the timeRestrictionForChannelMeasurements is set to configured, the WD 22 derives the channel measurements for computing CSI reported in uplink slot n based on only the most recent, no later than the CSI reference resource, occasion of NZP CSI-RS (for example as defined in TS 38.211) associated with the CSI resource setting.

In some cases, timeRestrictionForInterferenceMeasurements may be also configured. In some embodiments, a similar one-to-one mapping may be configured in aperiodic CSI reporting.

After the network node 16 configures the one or more WDs 22, e.g., as described in the steps above, the network node 16 may transmit time-domain beamswept CSI-RS transmissions in the configured CSI-RS resource and the network node 16 may receive and associate the received CSI reports according to the mapping (e.g., CSI resource configuration parameters, CSI report configuration parameters such as periodicity, offset and timeRestrictionForChannelMeasurements configuration, etc.). In step 204, the network node 16 may transmit the first CSI-RS. The first CSI-RS is transmitted using the first precoder. In step 206, the network node 16 receives/obtains the first CSI report associated with the first CSI-RS transmission.

In steps 208 and 210, similar steps are performed as steps 204 and 206, but for the second CSI-RS transmission and the second CSI report. Specifically, in step 208, the second CSI-RS is transmitted using a second precoder (different from the precoders used for the other CSI-RS transmissions). In step 210, the network node 16 receives/obtains the second CSI report associated with the second CSI-RS transmission. For more than two CSI-RS transmissions and more than two CSI reports, similar steps can be performed for subsequent CSI-RS transmissions and their corresponding CSI reports.

For example, as shown in FIG. 6, for the first CSI-RS transmission, Beam 1 is used; for the second CSI-RS transmission, Beam 2 is used; for the third CSI-RS transmission, Beam 3 is used . . . and for the mth CSI-RS transmission, Beam M is used. If M beams are needed in order to cover the whole cell, the same beam may be repeated after M transmissions. More specifically, in the first M transmissions, beam 0, 1, . . . , M−1 may be used. And for the second M transmissions, beam 0, 1, . . . , M−1 be repeated and so on.

Figure 9:
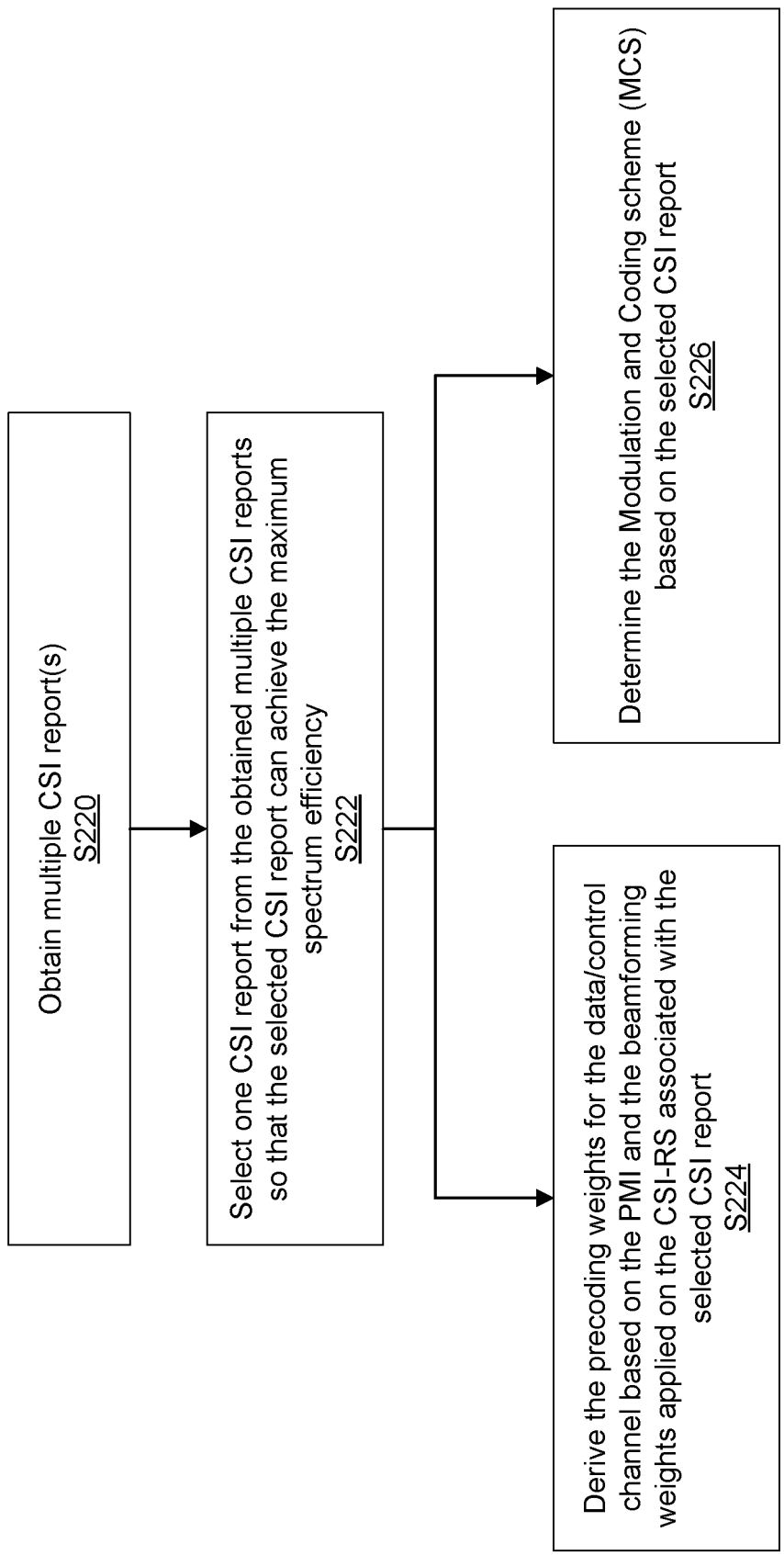
FIG. 9 is a flowchart of an example implementation for the link adaptation and beamforming for data/control channels according to some embodiments of the present disclosure.

After the network node 16 receives multiple CSI reports according to the techniques in the present disclosure, such as, for example, the CSI reports obtained in the process depicted in FIG. 8, the network node 16 may use these CSI reports for link adaptation and data/control transmission. FIG. 9 is a flowchart illustrating an example of how the network node 16 can use the CSI reports and/or the information therein. One or more of the CSI reports may include one or more of the following information: channel quality indicator (CQI), precoding matrix indicator (PMI), rank indicator (RI), etc. In some embodiments, after M CSI reports are received by the network node 16 in step S220, the network node 16 may select one CSI report out of the received CSI reports in step S222. As one example criteria to select the CSI report, spectrum efficiency criteria can be used. One example of spectrum efficiency is rank indication (RI) times wideband channel quality indicator (CQI). The CSI report that can achieve maximum spectrum efficiency can be selected as the candidate CSI report. In other embodiments, yet other criteria, thresholds and/or conditions may be used to select one or more CSI report(s) out of the received CSI reports.

In step S224, the network node 16 derives the precoding weights for the data/control channel (e.g., downlink data/control channel, physical downlink shared channel, physical downlink control channel, sidelink channel (such as may be used in machine to machine communications), etc.) based on a precoding matrix indicator (PMI) included in the selected CSI report and the weighting/weights used for the CSI-RS transmission associated with the selected CSI report. As one example, assume $W_m$ is the CSI-RS beamforming precoder for the mth CSI transmission, and the $W_{PMI_m}$, $CQI_m$, $RI_m$ are the physical downlink shared channel (PDSCH) precoder indicated by the reported PMI, CQI and Rank indicator included in the CSI report associated with the mth CSI transmission respectively, and $m_{sel}$ is the selected CSI report, then the weighting for the data/control channel can be derived according to:

$$W_{data/control} = W_{m_{sel}} * W_{PMI_{msel}}.$$

In step S226, the network node 16 can derive a modulation and coding scheme (MCS) for the data/control channel based on the selected CSI report (e.g., by means of link adaptation). As one example, MCS with spectrum efficiency which is close to the spectrum efficiency indicated by $CQI_m$ and $RI_m$ is selected as the MCS.

Some embodiments of the present disclosure have been provided for performance improvement for a WD supporting 8 or 4 CSI-RS ports and/or for a WD supporting use of a single CSI-RS resource.

Certain aspects of the present disclosure provide for network node transmission to WDs with limited CSI report capability. In some embodiments, a method implemented by e.g., a network node, includes one or more of the following:
1) Configuring one CSI-RS resource and performing time-domain beam sweeping for CSI-RS in the configured CSI-RS resource; and/or
2) Configuring TimeRestrictionForChannelMeasurements and/or timing CSI-RS transmissions and corresponding CSI reporting so that a WD's CSI report is e.g., one-to-one mapped to a beamformed CSI-RS transmission.
   Some of the embodiments provided in the present disclosure may have one or more of the following advantages:
   1) support for WDs with limited CSI report capability while also providing good performance, e.g., performance comparable to 32 CSI-RS port performance; and/or
   2) low complexity implementation for e.g., low capability WDs.

In some embodiments of the present disclosure, an improvement over existing techniques may include better beamforming gain, as each CSI-RS transmission is beamformed with narrow beamforming weights so that a fraction of the cell is coved. All M sweeping beams may ensure the whole cell is covered over time. This may also be referred to as so-called virtual sectorization and that fraction of the cell may be referred to a virtual sector. Using the same number of CSI-RS ports, the spatial granularity of a precoding matrix indicator (PMI) in a smaller virtual sector may be higher than when the PMI is covering the whole cell (e.g., using one 8 CSI-RS port resource, and 4 sweeping precoding vectors or 4 virtual sectors, the spatial granularity of PMI coverage is similar to that when using one 32 CSI-RS port resource to cover the whole cell; the beamforming performance may also be similar based on simulations and analysis). Some embodiments of the scheme proposed by the present disclosure can also be used to improve other aspects of the system, e.g., link adaptation, if CSI-RS resource is configured differently, or beamformed differently.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Also, in some embodiments, two blocks shown in succession may in fact be executed in a single step in other embodiments. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
receiving a Channel State Information-Reference Signal, CSI-RS, (CSI-RS) resource configuration for one CSI-RS resource;
receiving a CSI report configuration, the receiving of the CSI report configuration comprising receiving a time domain restriction for channel measurement configuration, the CSI-RS resource configuration and the CSI report configuration mapping each of a plurality of time-domain beam sweeping CSI-RS transmissions in the configured one CSI-RS resource to a corresponding CSI report;
receiving at least one of the plurality of time-domain beam sweeping CSI-RS transmissions in the configured one CSI-RS resource;
transmitting at least one CSI report according to the mapping; and
as a result of the time domain restriction for channel measurement configuration, performing a channel measurement for the at least one CSI report, the channel measurement based on a most recently received one of the plurality of time-domain beam sweeping CSI-RS transmissions, the most recently received one of the plurality of time-domain beam sweeping CSI-RS transmissions being no later than the CSI reference resource and being associated with the at least one CSI report.

2. The method of claim 1, wherein the plurality of time-domain beam sweeping CSI-RS transmissions includes a plurality of CSI-RS transmissions, each CSI-RS transmission being beamformed with a different precoder and transmitted in the configured one CSI-RS resource.

3. The method of claim 1, wherein the mapping includes arranging a time slot for each CSI report relative to a time slot for each respective time-domain beam swept CSI-RS transmission.

4. The method of claim 3, wherein the time slot for each CSI report and the time slot for each respective time-domain beam swept CSI-RS transmission are separated by a gap that is greater than or equal to a threshold value.

5. The method of claim 1, wherein the receiving the at least one of the plurality of time-domain beam sweeping CSI-RS transmissions in the configured one CSI-RS resource further comprises:
receiving a first CSI-RS transmission in the configured one CSI-RS resource during a first time slot, the first CSI-RS transmission encoded with a first precoder; and
receiving a second CSI-RS transmission in the configured one CSI-RS resource during a second time slot, the second CSI-RS transmission encoded with a second precoder, the second precoder being different from the first precoder and the second time slot occurring after the first time slot.

6. The method of claim 5, wherein the transmitting at least one CSI report according to the mapping further comprising:
as a result of receiving the first CSI-RS transmission during the first time slot, transmitting a first CSI report during a third time slot occurring at least a predetermined number, X, of time slots after the first time slot; and
as a result of receiving the second CSI-RS transmission during the second time slot, transmitting a second CSI report during a fourth time slot occurring at least a predetermined number, Y, of time slots after the second time slot.

7. The method of claim 1, further comprising:
communicating with a network node according to link adaptation based at least in part on the transmitted at least one CSI report.

8. The method of claim 1, further comprising:
receiving at least one physical channel, the at least one physical channel based at least in part on at least one of:
precoding weights derived at least in part from a precoding matrix indicator associated with a selected one of the at least one CSI report;
precoding weights derived at least in part from at least one beamforming weight applied to the CSI-RS transmission associated with a selected one of the at least one CSI report; and
a modulation and coding scheme determined according to a selected one of the at least one CSI report by link adaptation.

9. A method implemented in a network node, the method comprising:
determining a Channel State Information-Reference Signal (CSI-RS) resource configuration for one CSI-RS resource;
determining a CSI report configuration, the CSI-RS resource configuration and the CSI report configuration mapping each of a plurality of time-domain beam sweeping CSI-RS transmissions in the configured one CSI-RS resource to a corresponding CSI report;
transmitting the CSI-RS resource configuration and the CSI report configuration, the transmitting of the CSI report configuration comprising transmitting a time domain restriction for channel measurement configuration;

transmitting the plurality of time-domain beam sweeping CSI-RS transmissions in the configured one CSI-RS resource according to the mapping; and as a result of the time domain restriction for channel measurement configuration, receiving at least one CSI report based on a channel measurement of a most recently transmitted one of the plurality of time-domain beam sweeping CSI-RS transmissions, the most recently transmitted one of the plurality of time-domain beam sweeping CSI-RS transmissions being no later than the CSI reference resource and being associated with the at least one CSI report.

10. The method of claim 9, wherein the plurality of time-domain beam sweeping CSI-RS transmissions includes a plurality of CSI-RS transmissions, each CSI-RS transmission being beamformed with a different precoder and transmitted in the configured one CSI-RS resource.

11. The method of claim 9, wherein the mapping includes arranging a time slot for each CSI report relative to a time slot for each respective time-domain beam swept CSI-RS transmission.

12. The method of claim 11, wherein the time slot for each CSI report and the time slot for each respective time-domain beam swept CSI-RS transmission are separated by a gap that is greater than or equal to a threshold value.

13. The method of claim 9, wherein the transmitting the at least one of the plurality of time-domain beam sweeping CSI-RS transmissions in the configured one CSI-RS resource further comprises:

transmitting a first CSI-RS transmission in the configured one CSI-RS resource during a first time slot, the first CSI-RS transmission encoded with a first precoder; and transmitting a second CSI-RS transmission in the configured one CSI-RS resource during a second time slot, the second CSI-RS transmission encoded with a second precoder, the second precoder being different from the first precoder and the second time slot occurring after the first time slot.

14. The method of claim 13, further comprising:

as a result of transmitting the first CSI-RS transmission during the first time slot, receiving a first CSI report during a third time slot occurring at least a predetermined number, X, of time slots after the first time slot; and as a result of transmitting the second CSI-RS transmission during the second time slot, receiving a second CSI report during a fourth time slot occurring at least a predetermined number, Y, of time slots after the second time slot.

15. The method of claim 9, further comprising:

receiving at least one CSI report according to the mapping; and communicating with a wireless device according to link adaptation based at least in part on the received at least one CSI report.

16. The method of claim 9, further comprising:

receiving a plurality of CSI reports according to the mapping;

selecting one out of the plurality of CSI reports; and at least one of:

deriving precoding weights for at least one physical channel based at least in part on a precoding matrix indicator associated with the selected CSI report;

deriving precoding weights for the at least one physical channel based at least in part on at least one beamforming weight applied to the CSI-RS transmission associated with the selected CSI report; and determining, by link adaptation, a modulation and coding scheme for the at least one physical channel based at least in part on the selected CSI report.

* * * * *